(12) United States Patent
Voth

(10) Patent No.: US 11,773,926 B2
(45) Date of Patent: Oct. 3, 2023

(54) INTELLIGENT CLUTCH PACK LUBRICATION IN WORK VEHICLE POWERSHIFT TRANSMISSIONS

(71) Applicant: Deere & Company, Moline, IL (US)

(72) Inventor: Danny G. Voth, Liberty, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/504,688

(22) Filed: Oct. 19, 2021

(65) Prior Publication Data

US 2023/0122398 A1    Apr. 20, 2023

(51) Int. Cl.
*F16D 48/06* (2006.01)
*F16D 13/74* (2006.01)

(52) U.S. Cl.
CPC ........... *F16D 48/062* (2013.01); *F16D 13/74* (2013.01); *F16D 2500/1045* (2013.01); *F16D 2500/10412* (2013.01); *F16D 2500/3056* (2013.01); *F16D 2500/30404* (2013.01); *F16D 2500/30816* (2013.01); *F16D 2500/30825* (2013.01); *F16D 2500/70448* (2013.01)

(58) Field of Classification Search
CPC . F16D 2500/70448; F16D 2500/70446; F16D 2500/7045
See application file for complete search history.

(56) References Cited

U.S. PATENT DOCUMENTS

| | | | |
|---|---|---|---|
| 5,230,664 A * | 7/1993 | Michioka | F16H 57/0435 475/275 |
| 5,669,479 A | 9/1997 | Matsufuji | |
| 6,002,976 A | 12/1999 | Hollstein et al. | |
| 6,435,049 B1 | 8/2002 | Janasek et al. | |
| 7,311,187 B2 * | 12/2007 | Koenig | F16D 21/06 192/48.8 |
| 2004/0014563 A1 | 1/2004 | Janasek et al. | |

(Continued)

FOREIGN PATENT DOCUMENTS

| | | |
|---|---|---|
| DE | 102006011801 A1 | 9/2007 |
| DE | 102010039171 A1 | 2/2012 |

(Continued)

OTHER PUBLICATIONS

German Search Report issued in application No. DE 102022207946.9 dated Aug. 8, 2023 (14 pages).

*Primary Examiner* — Timothy Hannon
(74) *Attorney, Agent, or Firm* — KLINTWORTH & ROZENBLAT IP LLP

(57) ABSTRACT

An intelligent clutch lubrication system includes a first dynamically-lubricated clutch pack, a supply pump, a first lubricant control (LC) valve, and a lubricant flow circuit having a clutch lubrication loop in which the first clutch pack is positioned. When active, the supply pump urges lubricant flow about the lubricant flow circuit and through the clutch lubrication loop. The first LC valve is positioned in the clutch lubrication loop at a location upstream of the first clutch pack, while a controller architecture is operably coupled to the first LC valve. the controller architecture is configured to control the first LC valve to temporarily boost lubricant flow to the first DL clutch pack when moving into an engaged position during operation of the intelligent clutch lubrication system.

18 Claims, 5 Drawing Sheets

(56) References Cited

U.S. PATENT DOCUMENTS

2017/0089402 A1\* 3/2017 Deakin ................... F16D 25/14
2020/0158186 A1\* 5/2020 Saito ................... F16H 57/0473

FOREIGN PATENT DOCUMENTS

| DE | 102011081006 A1 | 2/2013 |
| DE | 102022121231 A1 | 3/2023 |
| JP | 2001-263464 A2 | 9/2001 |

\* cited by examiner

INTELLIGENT CLUTCH PACK LUBRICATION IN WORK VEHICLE POWERSHIFT TRANSMISSIONS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to systems and methods for intelligently varying lubricant flow through clutch packs contained in a work vehicle powershift transmission.

BACKGROUND OF THE DISCLOSURE

Work vehicles employed in construction, mining, agriculture, and forestry industries routinely operate under heavily loaded conditions. Often, such work vehicles are equipped with powershift transmissions (PSTs), which enable an operator to select the speed and directional output of the PST utilizing a manual control device, such as a shift control lever. A given PST may contain multiple hydraulically-actuated, wet clutch packs, each controlled (engaged and disengaged) by a transmission control unit (TCU) in signal communication with the shift control lever. During operation, the TCU receives input signals from the shift control lever and translates the input signals into commands sent to a number of valve actuators, such as solenoid-based actuators, which adjust valve positioning to control pressurized hydraulic flow to the clutch packs. By common design, when a sufficient hydraulic pressure is applied to a particular clutch pack, a hydraulic piston or plate within the clutch pack extends, overcoming an opposing spring force and pressing a clutch pack disc stack into rotational engagement. Utilizing multiple hydraulically-actuated clutch packs acting on different rotating components in a gear train, and by appropriately synchronizing clutch pack actuation via the TCU, a work vehicle PST may enable an operator to quickly select amongst a relatively large number of gear settings and speed ranges, often in both forward and reverse directions of the work vehicle.

SUMMARY OF THE DISCLOSURE

An intelligent clutch lubrication system is utilized in conjunction with a work vehicle powershift transmission (PST) containing first and second PST components. In an example embodiment, the intelligent clutch lubrication system includes a first dynamically-lubricated (DL) clutch pack movable between an engaged position and a disengaged position to rotationally couple and decouple the first and second PST components, respectively. In addition to the first DL clutch pack, the intelligent clutch lubrication system includes a supply pump, a first lubricant control (LC) valve, and a lubricant flow circuit having a clutch lubrication loop in which the first clutch pack is positioned. When active, the supply pump urges lubricant flow about the lubricant flow circuit and through the clutch lubrication loop. The first LC valve is positioned in the clutch lubrication loop at a location upstream of the first clutch pack, while a controller architecture is operably coupled to the first LC valve. The controller architecture is configured to control the first LC valve to temporarily boost lubricant flow to the first DL clutch pack when initially moved into the engaged position during operation of the intelligent clutch lubrication system.

Further disclosed are methods carried-out by a controller architecture included in an intelligent clutch lubrication system, which is located onboard a work vehicle having a PST. The controller architecture is coupled to a first LC valve positioned in a clutch lubrication loop at a location upstream of a first DL clutch pack. Embodiments of the method include the steps or processes of: (i) determining, via data transmitted to the controller architecture, when the first DL clutch pack moves from a disengaged position into an engaged position in which the first DL clutch pack rotationally couples first and second components contained in the PST; and (ii) controlling the first LC valve, via commands transmitted from the controller architecture to the first LC valve, to temporarily boost lubricant flow to the first DL clutch pack when initially moved into the engaged position during operation of the intelligent clutch lubrication system.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
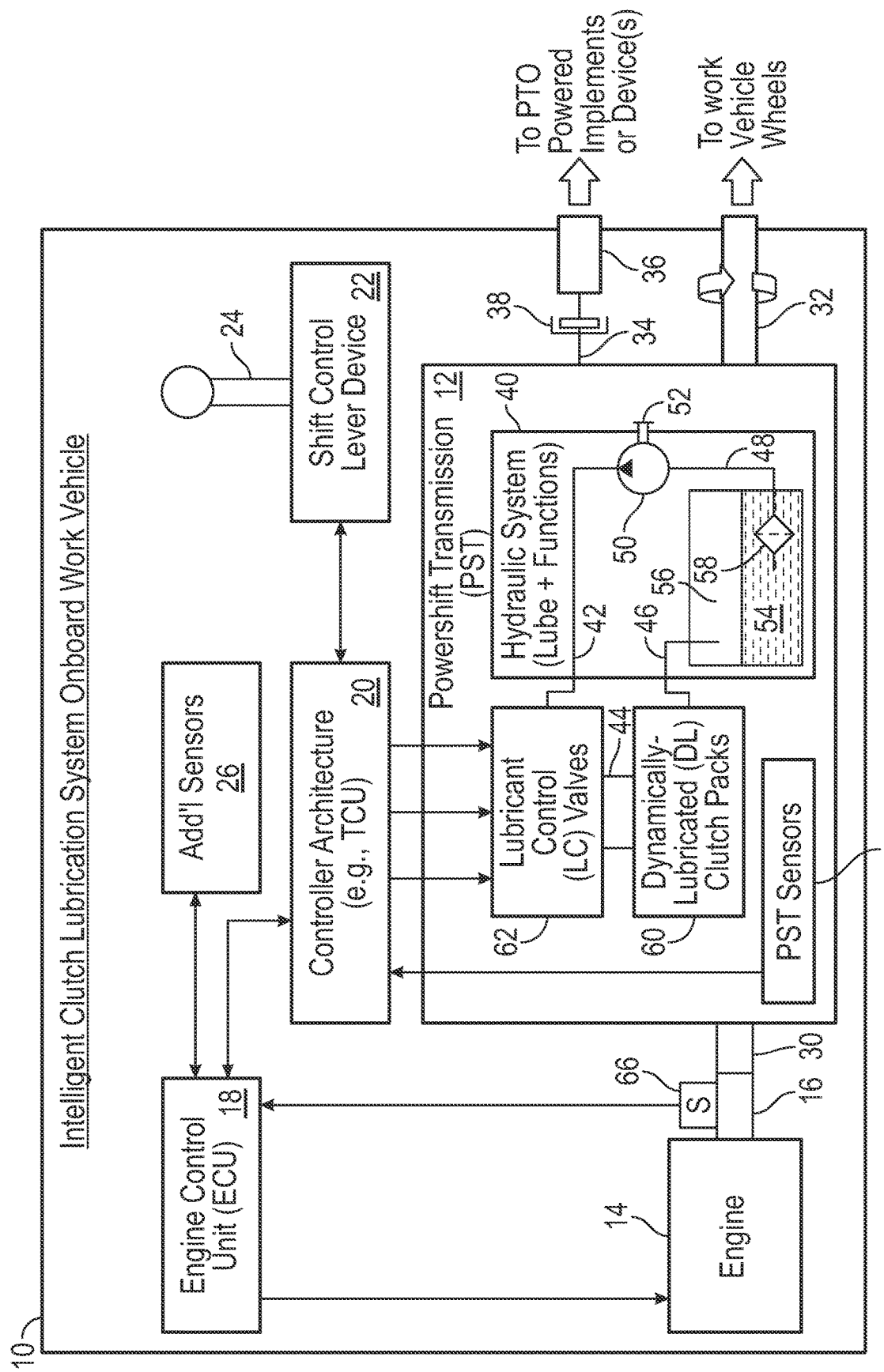
FIG. 1 schematically illustrates an intelligent clutch lubrication system including a work vehicle powershift transmission containing at least one dynamically-lubricated (DL) clutch pack, as presented in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims.

Overview

As noted above, work vehicles powershift transmissions (PSTs) commonly contain multiple actively-lubricated, wet clutch packs for selectively placing PST components, such as rotating shafts or gears, in rotational engagement. During PST operation, the clutch packs are actuated or engaged in accordance with commands issued by a controller, such as a transmission control unit (TCU). The PST clutch packs thus receive pressurized hydraulic flow (e.g., a first oil stream) for clutch pack engagement, as well as lubricant flow (e.g., a second oil stream) for lubrication and/or cooling purposes. The cooling lubricant flow, in particular, may be directed over and across components within the clutch pack (e.g., the clutch disc stack) to remove and help dissipate excessive amounts of waste heat generated due to frictional forces occurring during clutch pack engagement. Such an active cooling function may be vital in the context of many work vehicle platforms considering, for example, the relatively large heat quantities potentially generated during clutch pack engagement depending upon clutch pack function, the physical characteristics of the clutch pack, and the operational conditions of the work vehicle. As a specific example, in the case of a work vehicle equipped with a front bucket, such as a wheel loader or a tractor outfitted with a front end loader (FEL) attachment, significant heat quantities may be rapidly generated in conjunction with engagement of a PST clutch pack responsible for transitioning the work vehicle between travel in forward and reverse directions. Clutch pack heating may be particularly pronounced under operational scenarios in which an operator controls the PST to change work vehicle travel directions in a relatively abrupt manner.

By continually circulating oil or another cooling lubricant through the PST clutch packs, existing work vehicle PSTs are capable of mitigating the relatively high, transient heat loads imparted to clutch packs during most instances of clutch engagement (herein, "clutch engagement events" or "CE events"). The conventional approach of continually circulating cooling lubricant through multiple PST clutch packs at a substantially constant flow rate regardless of the current operational state of the PST and the larger work vehicle is, however, associated with several limitations. Such a non-varying, system-wide approach for actively cooling the PST clutch packs often necessitates the usage of a relatively large lubricant volume and the inclusion of an over-sized lubricant supply pump within the hydraulic system. Additionally, should PST clutch pack engagement occur under conditions inducing rapid frictional heating within a given clutch pack (herein, a "high energy CE event"), insufficient or suboptimal cooling of the PST clutch pack can occur, which may reduce clutch pack lifespan or have other negative outcomes. Concurrently, other clutch packs within a given work vehicle PST may receive excess lubricant flow (that is, a lubricant stream volume outstripping the individual cooling and lubrication needs of the clutch pack) depending upon clutch pack usage, clutch pack type, the manner in which the PST is operated, and similar factors. This, in turn, may increase windage within the PST clutch packs and exacerbate the overall energy losses of the PST. For at least these reasons, an ongoing industrial need persists for enhanced clutch lubrication systems capable of distributing lubricant flow to PST clutch packs in an increasingly intelligent or strategic manner during PST operation.

In satisfaction of the above-described industrial need, intelligent clutch lubrication systems are disclosed for usage in conjunction with PST assemblies onboard industrial work vehicles. Embodiments of the intelligent clutch lubrication system include at least one, if not several dynamically-lubricated (DL) clutch packs; that is, clutch packs through which lubricant flow is actively varied during work vehicle operation to modify through-clutch lubricant flow rates to more closely correspond with the real-time cooling demands of the individual DL clutch packs. To perform such functions, embodiments of the intelligent clutch lubrication system include a processing subsystem or "controller architecture," which brings about controlled variances in lubricant flow through one or more DL clutch packs based on clutch pack usage and/or or other factors affecting the unique, clutch pack-specific cooling demands as such demands vary over time with PST operation and, more broadly, with operation of the work vehicle onboard equipped with the intelligent clutch lubrication system (herein, the "host work vehicle"). In addition to the controller architecture, the intelligent clutch lubrication system also contains various hydraulic components, including a lubricant supply pump and a lubricant flow circuit. The lubricant flow circuit includes, in turn, a number of flow loops or branches (herein, "clutch lubrication loops") in which different DL clutch packs are fluidly positioned. Operably coupled to the controller architecture, lubricant control (LC) valves are further positioned in the clutch lubrication loops at locations upstream of the DL clutch packs. The controller architecture monitors for clutch pack engagement during PST operation; and, when a particular DL clutch pack is engaged (or group of clutch packs are engaged), temporarily boosts cooling lubricant flow supplied to the particular DL clutch pack or packs through appropriate commands transmitted to the corresponding LC valve or valves.

In the manner just described, the intelligent clutch lubrication system may temporarily increase or boost cooling lubricant flow supplied to a particular DL clutch pack on an on-demand or as-needed basis to provide enhanced heat dissipation during clutch pack engagement. In so doing, the intelligent clutch lubrication system effectively distributes the cooling lubricant volume in an increasingly equitable or strategic manner across an array of clutch packs in accordance with the unique, time-varied cooling demands of each clutch pack. Multiple benefits are realized as a result. As a primary benefit, the overall heat dissipation capabilities of the intelligent clutch lubrication system are enhanced, which may be particularly beneficial for PST clutch packs otherwise prone to excess heat generation during high energy CE events. Concurrently, the overall volume of lubricant (e.g., oil) utilized during operation of the intelligent clutch lubrication system may be reduced, while energy losses and windage within the PST clutch packs are minimized. Still other benefits may also be realized through incorporation of the intelligent clutch lubrication system into a given work vehicle, such as the potential downsizing of the lubricant supply pump, as will become apparent to one of ordinary skill in the relevant field from the following description and accompanying drawing figures.

Embodiments of the controller architecture can assume numerous forms and may contain any number of individual processing components (e.g., controllers or control units), which communicate over wired or wireless data connections. In certain instances, the controller architecture may include or assume the form of a transmission control unit (TCU) in signal communication with an engine control unit (ECU) located onboard an agricultural work vehicle (e.g., a tractor), a construction work vehicle (e.g., a wheel loader), or a work vehicle employed within another industrial context. For a given or first DL clutch pack, the controller architecture may normally (by default) control the intelligent clutch lubrication system to significantly restrict, if not fully block lubricant flow to the first DL clutch pack by commanding an LC valve upstream of the first DL clutch pack to remain in a flow restricted position; the term "flow restricted position," as appearing herein, referring to the position of an LC valve (or, more accurately, a valve element contained within the LC valve) in which a minimum amount of lubricant flow is permitted through the LC valve or, perhaps, a position in which the LC valve fully blocks lubricant flow therethrough.

The controller architecture may then temporarily boost lubricant flow permitted through the DL clutch pack in conjunction with clutch pack engagement by commanding the LC valve to move into a position permitting increased lubrication flow to the first DL clutch pack. As a specific example, in an implementation in which the intelligent clutch lubrication system includes a first LC valve upstream of a first DL clutch, the controller architecture may monitor for engagement of the first DL clutch utilizing pertinent sensor input, such as operator commands controlling the PST. When determining that engagement of the first DL clutch has just occurred or will occur in an imminent timeframe, the controller architecture commands the first LC valve to move into a fully opened position, thereby permitted a temporary boost in lubricant flow to reach an inlet of the first DL clutch. The first LC valve is then maintained in a fully opened or partially opened position for an ensuing period of time (herein, the "flow boost period"), which is effectively synchronized with clutch pack engagement. When the flow boost period subsequently elapses, the controller architecture commands the first LC valve to return to the default flow restricted (partially or fully closed) position to again reduce, if not wholly block lubricant flow to the first DL clutch pack. Such a control scheme may be implemented by the controller architecture for any number DL clutch packs contained in a given PST, thus allowing the controller architecture to continually apportion and reapportion lubricant flow amongst the DL clutch packs as the clutch packs transition individually between engaged and disengaged states in accordance with operator commands and piloting of the host work vehicle.

Varying levels of algorithmic intelligence can be introduced into embodiments of the intelligent clutch lubrication system. In less complex embodiments, the controller architecture may be configured (as specified in computer-readable instructions or code stored in memory and executed by the controller architecture) to command at least one LC valve to move from the default flow restricted position to a fully opened position for a flow boost period having a fixed or invariable duration, regardless of the specific operational conditions under which clutch engagement occurs. Further, as noted above, embodiments of the controller architecture may perform the above-described actions for any practical number of DL clutches within a given work vehicle PST as each clutch engages and disengages over time in conjunction with operation of the host work vehicle. In such embodiments, the average flow rate and duration of the flow boost period may not vary between iterations of the lubricant flow boost for a particular DL clutch pack; however, either or both of these parameters may vary between clutch packs within the PST in at least some instances. To this end, and as previously discussed above, the controller architecture may then command the LC valve to remain in the fully opened position for a fixed duration of time (e.g., on the order of 30 seconds) commencing substantially concurrently with engagement of the first DL clutch pack; and, when this period of time elapses, further control the first LC valve to return to the flow restricted position to again reduce or block lubricant flow to the first DL clutch pack. Meanwhile, the controller architecture may further command a second LC valve to remain in the fully open position for a longer period of time (e.g., on the order 60 seconds) when a second DL clutch pack downstream of the second LC valve engages should, for example, the second DL clutch pack tend to have higher cooling demands than does the first DL clutch pack; e.g., as may be the case when the second DL clutch pack is utilized to change the directional output of the PST, while the first clutch DL clutch pack is utilized to vary a speed output of the PST. In such embodiments, the controller architecture may determine the duration of the flow boost period for a particular clutch pack by retrieving clutch pack-specific information from a computer-readable memory onboard the work vehicle.

In more complex implementations, the controller architecture may vary one or more parameters of the lubricant flow boost based upon pertinent sensor input. In embodiments, sensor input indicative of an amount of energy likely to be converted to frictional waste heat during clutch engagement (herein, the projected "heating intensity level" of a CE event) may be considered by the controller architecture in determining the duration of the lubricant flow boost or the average flow rate of the lubricant supplied to a particular clutch pack during the lubricant flow boost. More specifically, such data may be indicative of: (i) the current rotational speeds of PST components, (ii) the current output speed of the work vehicle engine, (iii) a current load carried by the work vehicle (as may be relevant when the work vehicle contains a bucket, bed, or other vessel for carrying relatively heavy loads), or (iv) other information useful in assessing slippage and frictional forces converting mechanical energy into waste heat during clutch pack engagement. Utilizing such data inputs, the controller architecture may then vary the duration of lubricant flow boost and/or an average flow rate during the lubricant flow boost based upon an anticipated heating intensity level associated with clutch engagement. Such variations can be implemented in a gradual manner over a relatively continual range; or, instead, may be implemented in a more discrete or stepped manner, as discussed below in conjunction with FIGS. 4-6. Additionally or alternatively, the controller architecture may also consider other pertinent data in adjusting the lubricant flow boost parameters in embodiments, such as temperature data indicative of a current temperature of a DL clutch pack, a current ambient temperature, or a current temperature of the cooling lubricant flow, as further discussed below.

The foregoing has thus generally described several example implementations of an intelligent clutch lubrication system suitably deployed on an industrial work vehicle, which may temporarily boost cooling lubricant flow to any number of clutch packs in conjunction with clutch pack engagement. Additional description of an example intelligent clutch lubrication system is set-forth in greater detail below in connection with FIGS. 1 and 2, and description of an intelligent clutch lubrication method suitably carried-out by the intelligent clutch lubrication system is further provided below in connection with FIGS. 3-6. The following description should be understood as merely providing a non-limiting example context in which embodiments of the present disclosure may be better understood.

Example Intelligent Clutch Lubrication Systems and Associated Methods

Referring initially to FIG. 1, a work vehicle intelligent clutch lubrication system 10 is schematically illustrated in accordance with an example embodiment of the present disclosure. The intelligent clutch lubrication system 10 is well-suited for deployment onboard a wide range of industrial work vehicles equipped with powershift transmissions, such as an illustrated PST 12 configured to split or divide the mechanical power output of a work vehicle engine 14 between a primary output shaft 32 and power takeoff (PTO) shaft 36 of the host work vehicle. The intelligent clutch lubrication system 10 also includes a number of processing components in the form of an engine control unit (ECU) 18 and a processing subsystem or "controller architecture" 20, which may encompass or assume the form of a transmission control unit (TCU) in embodiments. The controller architecture 20 is operably coupled to (that is, in signal communication with) various sensors 26, 28 onboard the work vehicle, as well as manual input controls utilized in piloting the work vehicle (and noting that embodiments of the present disclosure are equally applicable to work vehicles capable of remote piloting or autonomous operation). Such manual input controls may include, for example, a shift control lever device 22 having a shift control lever 24, which is manipulated by an operator to control the PST 12 during work vehicle operation.

As indicated above, the schematically-depicted PST 12 includes an input shaft 30, a primary output shaft 32, and a secondary output shaft 34. The PST input shaft 30 is mechanically linked to an output shaft 16 of the work vehicle engine 14, which may assume the form of a heavy duty diesel engine in embodiments. Rotation of the primary output shaft 32 of the PST 12 drives rotation of the wheels or tracks of the host work vehicle propelling the work vehicle in forward or rearward directions. Comparatively, rotation of the secondary output shaft 34 of the PST 12 may drive co-rotation of the PTO shaft 36 when, for example, an intervening PTO clutch 38 is engaged. The spinning PTO shaft 36 may, in turn, mechanically drive any number and type of devices onboard the work vehicle; or, perhaps, devices or mechanisms contained in an implement or external machine attached to the work vehicle. As a specific example, when the host work vehicle assumes the form of an agricultural tractor, rotation of the PTO shaft 36 may power an agricultural implement attached to the tractor in a tow arrangement. The PST 12 also includes various non-illustrated structural components (e.g., gears, shafts, rolling element bearings, and so on) forming a PST geartrain, which mechanically links the input shaft 30 of the PST 12 to the outputs shafts 32, 34. In other embodiments, the PST 12 may lack a PTO shaft or may otherwise differ relative to the illustrated example.

A hydraulic system 40 is further included within, or generally associated with, the intelligent clutch lubrication system 10. The term "hydraulic system," as appearing herein, refers to a system for supplying and controlling the flow of one or more fluids, such as oil, utilized for hydraulic actuation, lubrication, and/or cooling purposes onboard a work vehicle. Again, the hydraulic system 40 is depicted in a highly simplified form in FIG. 1 for clarity, noting that hydraulic systems onboard work vehicles are often highly complex systems supporting a range of hydraulic functions including both active lubrication of components (e.g., a transmission and, perhaps, axle assemblies) and hydraulic actuation functions (e.g., the movement of hydraulic motors and/or pistons utilized to animate implements for performing work tasks). This stated, the hydraulic system 40 may generally include a lubricant flow circuit 42, 44, 46, 48 in which at least one lubricant-conducting pump, such a lubricant supply pump 50, is positioned. In embodiments, the lubricant supply pump 50 may be fixed displacement, gear-driven pump having a shaft 52 mechanically powered by the mechanical output of the engine 14 through a suitable drive arrangement. In other instances, the supply pump 50 may assume a different form and/or the hydraulic system 40 may include any number of additional pumps, such as one or more boost pumps. When active, the supply pump 50 urges lubricant flow around the lubricant flow circuit 42, 44, 46, 48, which includes a sump 56 containing a larger volume or reservoir 54 of lubricant. The lubricant circulated about the lubricant flow circuit 42, 44, 46, 48 by action of the supply pump 50 may also pass through one or more clutch lubricant loops, an example of which is shown and discussed below in connection with FIG. 2.

When active, the supply pump 50 draws oil or another lubricant from the reservoir 54 through a first flow line 48 in which a filter element 58 may be fluidly positioned. The supply pump 50 discharges the pressurized lubricant stream into a supply line network 42, 44, which is fluidly coupled to multiple DL clutch packs 60 and which may be composed of any number of individual conduits (e.g., pipes or hoses), manifolds, or similar features for conducting and directing the pressurized lubricant flow. Multiple LC valves 62 are further positioned in the lubricant flow circuit 42, 44, 46, 48 at locations upstream of the DL clutch packs 60. The controller architecture 20 is operably coupled to the LC valves 62 in manner permitting the controller architecture 20 to control the positioning of the LC valves 62; and, specifically, in a manner permitting the controller architecture 20 to transmit commands (e.g., electrical signals in the form of variations in currents or voltages) to an actuator contained within each LC valve 62, which then positions a valve element in accordance with such commands. In so doing, the controller architecture 20 is able to control the rate of lubricant flow through the LC valves 62 and, therefore, the lubricant flow supplied to the DL clutch packs 60 downstream of the LC valves 62. Further, the controller architecture 20 may be in signal communication with an LC valve upstream of each DL clutch pack 60 (or, perhaps, a small group of DL clutch packs) such that the controller architecture 20 controls or regulates lubricant flow to each DL clutch pack 60 in an independent or individualized manner.

The term "controller architecture," as appearing throughout this document, is utilized in a non-limiting sense to refer generally to the processing components of the intelligent clutch lubrication system 10. The controller architecture 20 of the intelligent clutch lubrication system 10 can assume any form suitable for performing the processing functions described herein including, for example, the example intelligent clutch lubrication algorithm described below in connection with FIGS. 3-6. The controller architecture 20 can encompass or may be associated with any practical number of processors (central and graphical processing units), onboard control computers, navigational equipment pieces, computer-readable memories, power supplies, storage devices, interface cards, and other standardized components. For example, and as indicated above, the controller architecture 20 may assume the form of, or may encompass, a TCU of the type commonly located onboard work vehicles. Additionally, the controller architecture 20 may also be considered to encompass or contain ECU 18 (FIG. 1) in certain embodiments of the intelligent clutch lubrication system 10.

As further appearing herein, the term "valve" broadly refers to valve assembly including a valve element positioned in a flow passage, as well as a valve actuator for moving the valve element between two or more stable positions. By extension, the term "lubricant control valve" or "LC valve" refers to a valve, as just defined, utilized to control the flow of an oil stream or another pressurized lubricant stream. Considering this, reference to the controller architecture 20 as commanding or controlling a valve generally denotes that the controller architecture 20 causes the transmission of a suitable signal, whether electrical or fluidic in nature, to the valve actuator included in or associated with a particular valve, with the actuator then positioning the corresponding valve element in accordance with the commands of the controller architecture 20. Examples include electromagnetic (EM) valves, such as solenoid-based valves, which receive electrical signals in accordance with commands from the controller architecture 20 in a manner moving the solenoid plunger into a desired position, as further discussed below in connection with FIG. 2. Further, a given valve may be referred to as "bistable" when containing a valve element characteristically residing in either a first stable position (e.g., a position providing the least restriction to fluid flow, herein the "fully opened position") and a second stable position (e.g., a fully closed or partially closed position, herein as the "flow restricted position"), with the valve element only briefly moving through intermediate positions when transitioning between the opposing stable positions. Valves of this type may also be referred to as "shutoff valves"; again noting that, even when such terminology is utilized, such valves need not completely block all lubricant flow in the flow restricted position in all implementations. In other instances, a given valve may be capable of moving its valve element through and into a continuous range of stable positions and, thus, may be placed in various partially-opened or partially-closed positions for extended durations of time in accordance with commands received from the controller architecture 20.

Figure 2:
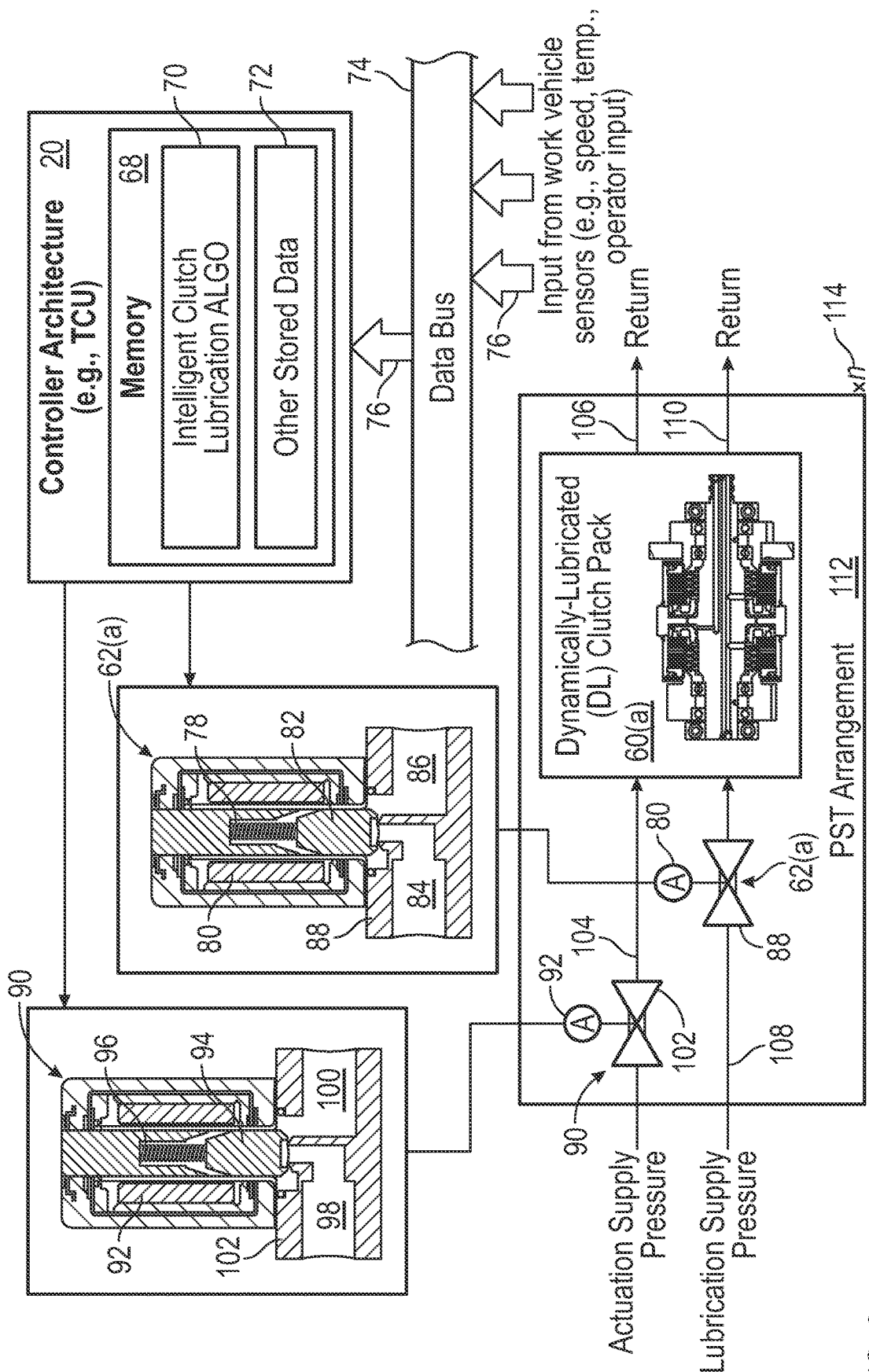
FIG. 2 schematically illustrates an example system architecture and data flow scheme of the intelligent clutch lubrication system shown in FIG. 1.

Referring now to FIG. 2 in conjunction with FIG. 1, the controller architecture 20 of intelligent clutch lubrication system 10 may include or cooperate with any number of firmware and software programs or computer-readable instructions designed to carry-out any pertinent process tasks, calculations, and control/display functions. The computer-readable instructions executed by the controller architecture 20 (including an intelligent clutch lubrication algorithm 70) may be stored within a non-volatile sector of a computer-readable memory 68 further contained in the intelligent clutch lubrication system 10. While generically illustrated in FIG. 2 as a single block, the memory 68 can encompass any number and type of storage media suitable for storing computer-readable code or instructions, as well as other data 72 utilized to support the below-described operation of the intelligent clutch lubrication system 10. Such other data 72 may include information specifying desired variations in the duration of boosted lubricant flow through the DL clutch packs 60, data specifying desired time-dependent variations in lubricant flow rate (scheduling) through the DL clutch packs 60 when supplied with a temporary boost in lubricant flow (e.g., potentially expressed as time-dependent valve commands or valve positions associated with a LC control valve 62 and stored as a two-dimensional look-up table), and/or other data useful in carrying-out the processes and functions described herein.

During operation of the intelligent clutch lubrication system 10, onboard sensors 26, 28, 66 may provide pertinent data to controller architecture 20; e.g., as indicated by arrows 76, the sensors may place data on a vehicular data bus 74 for reception by the controller architecture 20. PST sensors 26, 28 may include sensors for monitoring the rotational rate of relevant components (e.g., shafts and gears) within PST 12; by other sensors for monitoring the rotational rate of other components included in the drivetrain (e.g., sensor 66 for monitoring the rotational rate of engine output shaft 16 or, perhaps, similar sensors for monitoring the rotational rate of shaft 34 and/or PTO shaft 36); and any number of additional sensors 26 onboard the work vehicle. With respect to additional sensors 26, in particular, such sensors 26 can include temperature sensors for monitoring ambient temperatures and/or lubricant temperature of the lubricant flow circulated about the lubricant flow circuit 42, 44, 46, 48. For example, in embodiments, additional sensors 26 may include at least one temperature sensor for monitoring the temperature of the lubricant within the lubricant reservoir 54 or at another location within the lubricant flow circuit 42, 44, 46, 48. Operator input commands indicative of movement of the shift control lever device 22 or similar operator input commands may also be considered by the controller architecture 20 when executing the intelligent clutch lubrication algorithm, as described below in connection with FIG. 3. Here, it is also noted that the ECU 18 and the controller architecture (TCU) 20 are aware of operator commands given that is the function of these components to convert operator commands into suitable engine and transmission control signals; thus, embodiments of the present disclosure leverage this preexisting knowledge to synchronize the below-described transitory lubricant flow boosts supplied to the DL clutch packs 60 with clutch pack engagement or actuation as brought about by the controller architecture 20.

An example construction of an LC valve 62(*a*) is shown in FIG. 2, with the illustrated LC valve 62(*a*) generally representative of one or more LC valves 62 (FIG. 1) contained in the intelligent clutch lubrication system 10. In this example, the LC valve 62(*a*) is a variable flow EM valve including a proportional solenoid arrangement 80. The proportional solenoid arrangement 80 is configured to control the translational movement of a valve element (here, a plunger- or stopper-type valve element 82) through a continuous range of positions in conjunction with variations in the electrical power provided to (e.g., current and voltage differential applied across) the solenoid coils. The LC valves 62(*a*) also includes at least one spring 78, such as a wireform coil spring, which may resiliently bias the valve element 82 to a particular position; e.g., here, the LC valve 62(*a*) may normally reside in a flow restricted (a fully closed or partially closed) position, with the valve element 82 moving into an intermediate or fully open position when the EM force exerted on the valve element 82 by the solenoid arrangement 80 is sufficient to overcome the opposing resilient spring force. By sliding the valve element 82 into a desired translational position in accordance with commands issued by the controller architecture 20, the size of the flow restriction or orifice located between an inlet 84 and an outlet 86 of the LC valve flowbody 88 can be adjusted, as desired, to regulate cooling lubricant flow through the LC valve 62(*a*) and ultimately to the corresponding DL clutch pack 60(*a*).

As just described, LC valve 62(*a*) may be a variable flow valve, such as EM valve including a proportional solenoid, which enables the controller architecture 20 to adjust the position of the valve element within the valve 62(*a*) over a continuous range of positions to provide varying levels of impedance to lubricant flow. Various other valve designs are also possible for the LC valve 62(*a*) including EM shutoff valve designs in which the plunger or other (translating or rotating) valve element principally resides in either the flow restricted position or the fully open position, while only briefly passing through intermediate positions when moved between the two stable positions. This stated, PSTs onboard work vehicles often incorporate such proportional solenoid-type valves for another purpose, namely, for controlling actuation pressures applied to the clutch packs. This is indicated in FIG. 2 for a second example valve 90, which may likewise assume the form of a variable flow EM valve including a proportional solenoid arrangement 92 configured to move a plunger-type valve element 94 through a range of positions in opposition to at least one spring 96, thereby controlling the flow of pressurized hydraulic fluid from an inlet 98 to an outlet 100 of a flowbody or conduit 102. The actuation supply pressure control valve 90 may be positioned in a flow loop 104, 106 of the hydraulic system 40, with the example DL clutch pack 60(*a*) (included in the DL clutch packs 60 shown in FIG. 1) further positioned in this flow loop 104, 106. The DL clutch pack 60(*a*) can contain, for example, a hydraulically-actuated piston, which may press a stack of clutch discs together to engage the clutch pack 60(*a*) in opposition to a release spring (e.g., a wireform expansion spring) further contained in the clutch pack 60(*a*). An example of such a construction is shown in FIG. 2 and designated by reference numeral 64. Hydraulically-actuated clutch pack designs are well known and thus will not be described in greater detail at this juncture. In other embodiments, the DL clutch pack 60(*a*) can assume another form and may be actuated by other means, providing that the DL clutch pack 60(*a*) is capable of receiving a cooling lubricant stream therethrough, as described throughout this document.

Regardless of its particular design or construction, the DL clutch pack 60(*a*) is further positioned in a lubricant flow loop 108, 110, a limited portion of which is illustrated in FIG. 2. The lubricant flow loop 108, 110 is, in turn, included in the lubricant flow circuit 42, 44, 46, 48 (FIG. 2) of the hydraulic system 40 included in, or fluidly coupled to, the work vehicle PST 12. During operation of the hydraulic system 40, pressurized lubricant flow circulates about the lubricant flow circuit 42, 44, 46, 48 and is supplied to the inlet of the LC valve 62(*a*) via a flow line 108. As described above, the LC valve 62(*a*) may normally reside in the flow restricted position (a fully closed or partially closed position) in which the LC valve 62(*a*) either permits a minimal amount of lubricant flow to the DL clutch pack 60(*a*); or, instead, wholly blocks lubricant flow to the DL clutch pack 60(*a*). In conjunction with actuation or engagement of the DL clutch pack 60(*a*), the controller architecture 20 boosts lubricant flow to the DL clutch pack 60(*a*) by sending appropriate commands to the LC valve 62(*a*), thus bringing about variations in lubricant flow more closely synchronized or harmonized with the actual cooling needs of the DL clutch pack 60(*a*) in a general sense. To provide even greater harmony between the cooling needs of the DL clutch pack 60(*a*) and the characteristics of the cooling lubricant flow boost selectively applied thereto (or, more broadly, to better match the real-time cooling needs of any number of the DL clutch packs 60), the controller architecture 20 can vary the flow rate of the lubricant flow boost and the flow boost period in accordance with virtually any desired scheme or schedule, which imparts the intelligent clutch lubrication system 10 with a great degree of flexibility or adaptability from a design standpoint, as further discussed below in connection with FIGS. 4-6.

With continued reference to FIGS. 1 and 2, the DL clutch pack 60(*a*), the LC valve 62(*a*), the actuation pressure valve 90, and the associated flow loops collectively form a PST arrangement 112. As indicated in FIG. 2 by symbol 114, the intelligent clutch lubrication system 10 may contain multiple instances of such a PST arrangement 112 (or similar PST arrangements) to enable the controller architecture 20 to independently control the lubricant flow supplied to any practical number of DL clutch packs 60 contained in the work vehicle PST 12. Generally, then, the controller architecture 20 is advantageously capable of controlling a plurality of LC valves 62, each positioned upstream of one or more DL clutch packs 60, to strategically distribute or apportion cooling lubricant flow to the clutch packs 60 based upon the individualized, real-time or anticipated cooling demands of the clutch packs, as mentioned above and as discussed more fully below. An example process or algorithm for strategically suitably carried-out by the controller architecture 20 for varying the lubricant flow through at least one DL clutch pack, such as the DL clutch pack 60(*a*) shown in FIG. 2, will now be described in connection with FIGS. 3-6. While described in the context of the example intelligent clutch lubrication system 10 for purposes of explanation, embodiments of the below described method or algorithm can be carried-out in conjunction with other clutch lubrication systems capable of varying lubricant flow delivered to one or more wet clutch packs contained in a work vehicle PST.

Figure 3:
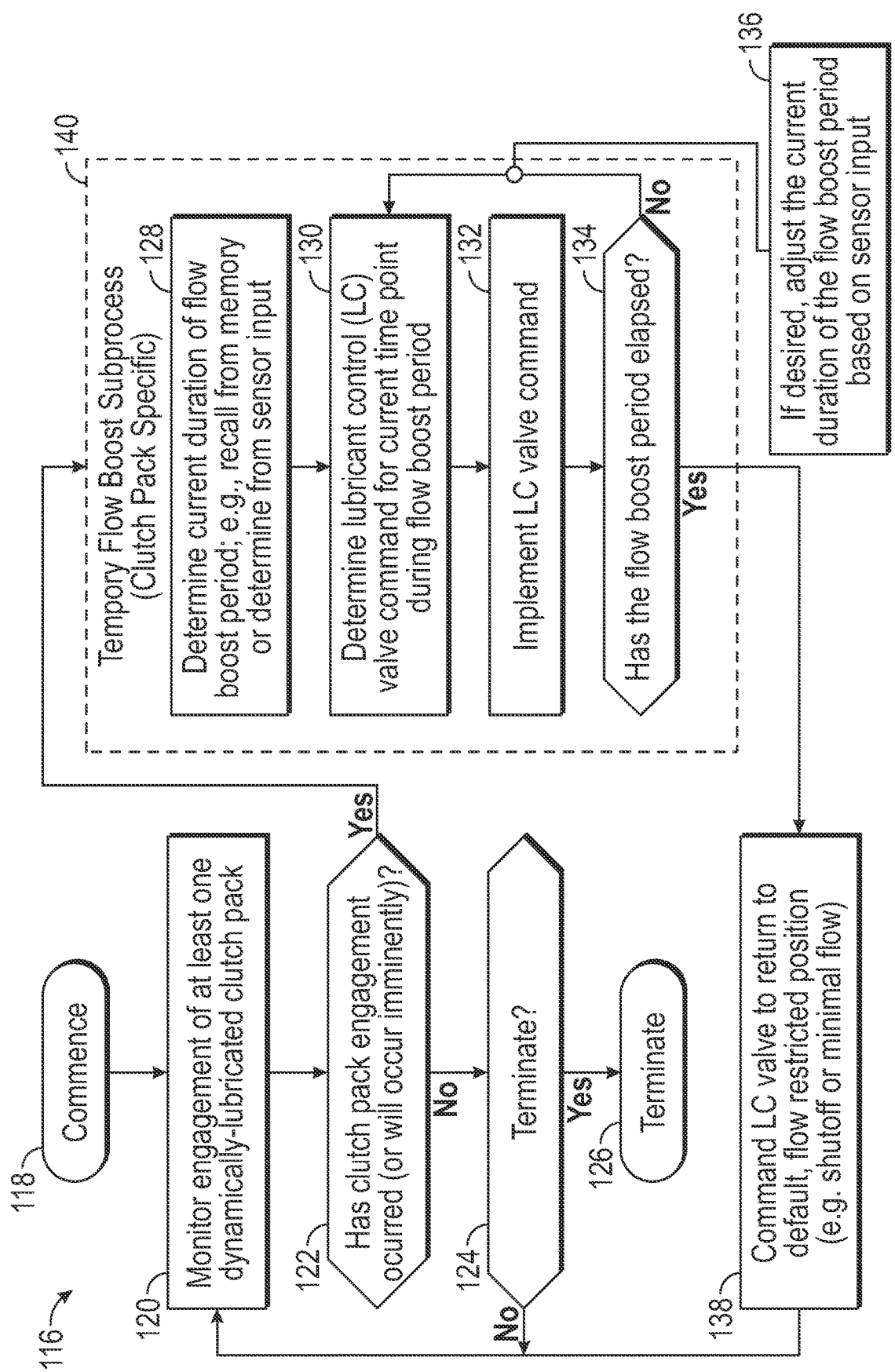
FIG. 3 is a flowchart of an example method suitably carried-out by a controller architecture included in the intelligent clutch lubrication system to temporarily boost lubricant flow through at least one DL clutch pack in conjunction with clutch pack engagement.

Turning now to FIG. 3, an intelligent clutch lubrication method 116 suitably carried-out by the controller architecture 20 of the intelligent clutch lubrication system 10 (FIGS. 1 and 2) is presented in accordance with an example embodiment of the present disclosure. The intelligent clutch lubrication method 116 includes a number of process STEPS 118, 120, 122, 124, 126, 128, 130, 132, 134, 136, 138 each of which is described, in turn, below. STEPS 128, 130, 132, 134, and 136, if and when performed, may be carried-out pursuant to a subprocess 140 (herein, "temporary flow boost subprocess 140"), which may be executed by the controller architecture 20 for any particular DL clutch pack 60 in conjunction with engagement of that particular clutch pack. Depending upon the particular manner in which the intelligent clutch lubrication method 116 is implemented, each step generically illustrated in FIG. 3 may entail a single process or multiple sub-processes. Further, the steps illustrated in FIG. 3 and described below are provided by way of non-limiting example only. In alternative embodiments of the intelligent clutch lubrication method 116, additional process steps may be performed, certain steps may be omitted, and/or the illustrated process steps may be performed in alternative sequences.

The intelligent clutch lubrication method 116 commences at STEP 118. The intelligent clutch lubrication method 116 may commence due to operator input initiating the method 116. Alternatively, the intelligent clutch lubrication method 116 may commence when the host work vehicle transitions from a shutdown state to an active state; or in response to the occurrence of any predetermined trigger condition. After the intelligent clutch lubrication method 116 commences (STEP 118), the controller architecture 20 advances to STEP 120 and monitors whether engagement of at least one DL clutch pack 60 has occurred or will occur within an imminent timeframe. As described above, the controller architecture 20 conveniently determine when clutch engagement occurs, or when clutch engagement will occur in immediate future, based upon operator input received in piloting the work vehicle, which are converted to clutch pack actuation signals by the controller architecture 20. Such operator input may be received as movement of shift control lever device 22, pedals, and other such manual control devices utilized to control the speed and directional output of the PST 12. Additionally or alternatively, the controller architecture 20 may also utilize other sensor data to directly detect or indirectly infer clutch pack actuation in other embodiments.

If determining that clutch engagement is not presently occurring or will not occur imminently (that is, within an immediate timeframe on the order of, for example, a few seconds) for any particular DL clutch pack 60 during STEP 122, the controller architecture 20 progresses to STEP 124 of intelligent clutch lubrication method 116. During this step, the controller architecture 20 assesses whether the current iteration of the intelligent clutch lubrication method 116 should terminate. If determining during STEP 124 that the intelligent clutch lubrication method 116 should terminate (e.g., due to deactivation by an operator), the controller architecture 20 progresses to STEP 126 and terminates the method 116 accordingly. If instead that the intelligent clutch lubrication method 116 should continue, the controller architecture 20 returns to STEP 120 and continues to monitor for data indicative of engagement of the DL clutch pack or packs 60 contained in the PST 12.

If instead determining that clutch engagement is presently occurring or will occur imminently for a given DL clutch pack 60 during STEP 122, the controller architecture 20 progresses to the temporary flow boost subprocess 140 during which the controller architecture 20 commands the LC valve 62 upstream of the appropriate clutch pack 60 (e.g., the LC valve 62(*a*) in the case of the DL clutch pack 60(*a*) shown in FIG. 2) to temporarily increase lubricant flow through the DL clutch pack 60 for a limited duration of time (herein, the "flow boost period"). In embodiments, the controller architecture 20 may determine the current duration of the flow boost period during the present iteration of the flow boost subprocess 140 (STEP 128); ascertain the appropriate LC valve command corresponding to the current time point during the flow boost period (STEP 130); and then implement the LC valve command by transmitting an appropriate control signal (STEP 132) to the LC valve. The controller architecture 20 may determine an appropriate valve command by recalling a time-dependent value from the memory 68, which may store a two-dimensional look-up table or characteristic defining desired valve positioning over the duration of the flow boost period. In the case of a variable flow EM valve, such as the example LC valve 62(*a*) shown in FIG. 2, the controller architecture 20 may then bring about appropriate variations in the electrical current or voltage applied across the solenoid coils to position the valve element (plunger 82) in accordance with the recalled value at the current timepoint, as discussed below.

As indicated in FIG. 3 at STEP 134, the above-described process steps are repeated, with the controller architecture 20 repeatedly determining a currently valve command and implementing this valve command, until elapse of the flow boost period. If desired, in at least some embodiments, the controller architecture 20 may also adjust the current duration of the flow boost period based upon sensor input (STEP 136), effectively forming a feedback loop. For example, in embodiments in which the controller architecture 20 receives temperature sensor data indicating that the lubricant outflow from the DL clutch pack 60 in question (that is, the clutch pack 60 presently receiving the lubricant flow boost) remains undesirably elevated despite the flow boost period nearing completion, the controller architecture 20 may extend the flow boost period (or, perhaps, increase the flow rate through the clutch pack 60) by some amount to provide additional cooling to more effectively dissipating heat from the clutch pack 60.

As described above, when executing the temporary flow boost subprocess 140, the controller architecture 20 of the intelligent clutch lubrication system 10 repeatedly determines desired valve position (or data corresponding to a desired valve position) at a given point in time (as measured from the beginning of the flow boost period) and implements corresponding valve commands until elapse of the flow boost period. As a specific example, consider a scenario in which engagement of the DL clutch pack 60(*a*) occurs at timepoint t0, with the flow boost subprocess also beginning substantially concurrently with clutch pack engagement at timepoint t0. The controller architecture 20 utilizes data stored in the memory 68 and any pertinent sensor data to determine a corresponding command for the LC valve 62(*a*) at timepoint t0 and then commands the LC valve 62(*a*) accordingly. The controller architecture 20 then repeatedly determines the proper valve positioning at a particular refresh rate or interval (e.g., on the order a second) and adjusts the valve positioning accordingly. This process repeats until the flow boost period elapses (STEP 134) and then the controller architecture 20 commands the LC valve 62(*a*) to return to the flow restricted position (STEP 138). Thus, as a relatively simply example, if the flow boost period is 30 seconds in duration, the controller architecture 20 may perform STEPS 130, 132, 134 once per second for a total of 30 times prior to conclusion of the temporarily flow boost subprocess 140. Further, the controller architecture 20 can perform the temporarily flow boost subprocess 140 for any number of DL clutch packs 60 within the PST 12, with multiple instances of subprocess 140 potentially being performed concurrently when appropriate, to continually apportion and reapportion cooling lubricant flow across the DL clutch packs 60 as different clutch packs are moved between engaged and disengaged positions during operation of the PST 12.

Figure 4:
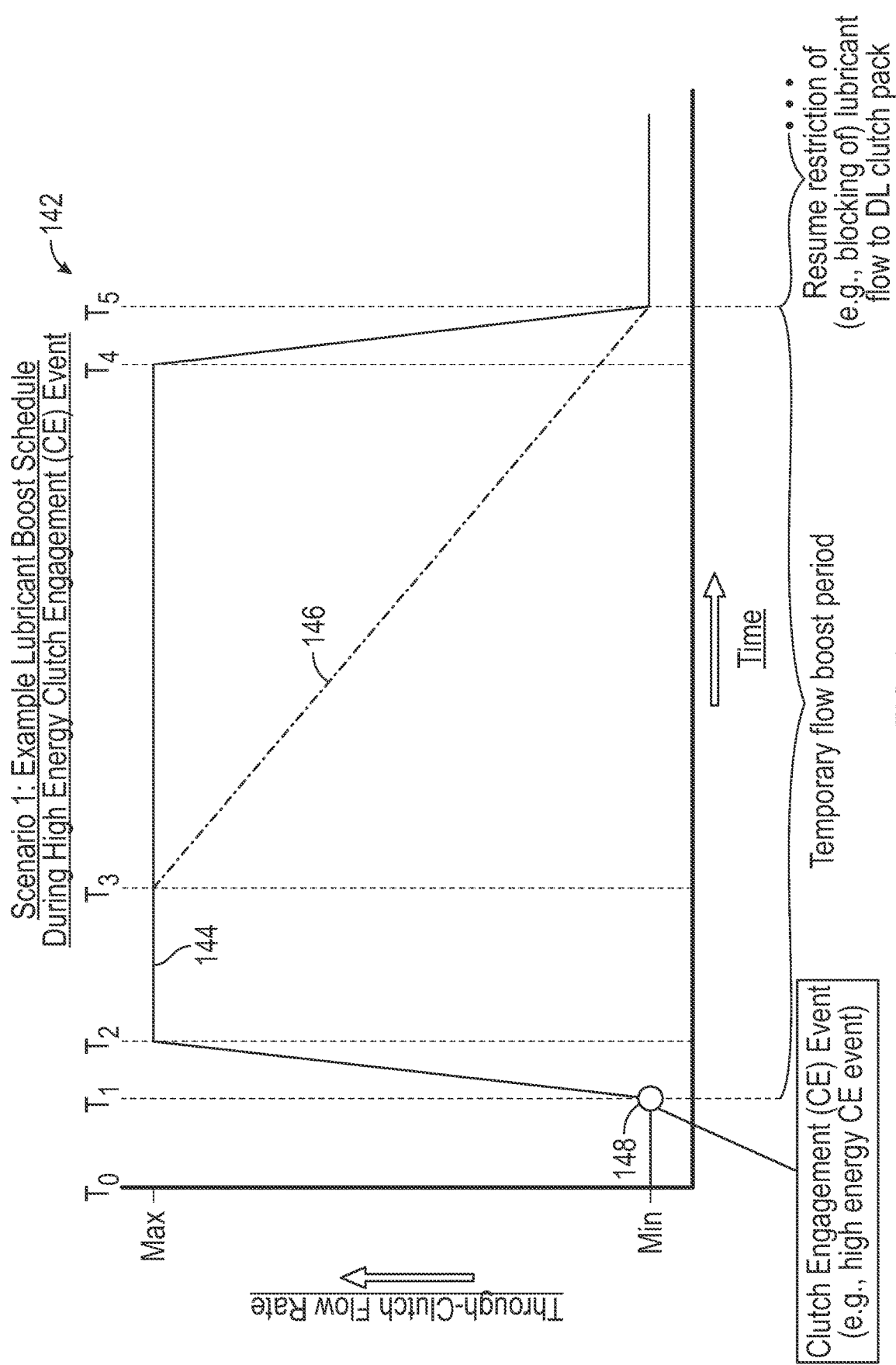
FIG. 4 graphically illustrates an example manner in which the intelligent clutch lubrication system may vary lubricant flow through a DL clutch pack during a clutch engagement (CE) event, such as a high energy CE event, via commands transmitted to an associated lubricant control valve.

Turning now to FIG. 4, a graph 142 expresses an example lubricant boost schedule or flow scheme suitably implemented by the controller architecture 20 during a particular instance of clutch engagement or clutch engagement (CE) event. Time is plotted along the horizontal axis or abscissa, with the passage of time occurring in a left to right direction. The flow rate of lubricant through a given DL clutch pack 60, as brought about by the lubricant flow rate through a corresponding LC valve 62, is plotted along the vertical axis or ordinate, with the flow rate increasing moving in an upward direction. An example lubricant boost schedule is expressed on the graph 142 as a trace or characteristic 144, which spans an arbitrary starting timepoint T0 to a timepoint T5. Here, the lubricant flow boost is triggered by a CE event occurring at timepoint T1, as indicated by a marker 148. In certain implementations, the controller architecture 20 may control the appropriate LC valve 62 in accordance with the flow boost characteristic 144 regardless of the energy level or projected heating severity of the CE event occurring at timepoint T1. In other implementations, the controller architecture 20 may control the appropriate LC valve 62 in accordance with the flow boost characteristic 144 only when the energy level or projected heating severity of the CE event is relatively high, with the controller architecture 20 potentially reducing the duration of the flow boost period or the rate of through-clutch lubricant flow during the flow boost period for lower energy CE events (that is, CE events projected to induce lesser amounts of clutch pack heating) as described below in connection with FIGS. 5 and 6.

As indicated by a first segment of flow boost characteristic 144 spanning timepoint T0 to timepoint T1, the controller architecture 20 positions the LC valve 62 to supply the DL clutch pack 60 with cooling lubricant flow at a minimal flow rate by default. In conjunction with clutch engagement (marker 148) occurring at timepoint T1, the controller architecture 20 commands the LC valve 62 to move into a fully opened position and thereby provide a cooling lubricant flow at a maximum flow rate to the corresponding DL clutch pack 60 from at least timepoint T2 to timepoint T3, with a ramp-up in flow rate occurring from timepoint T1 to timepoint T2 as the LC valve 62 transitions from the flow restricted position to the fully open position. In embodiments in which the LC valve 62 is a bistable valve, such as a solenoid-based EM shutoff valve, the controller architecture 20 may maintain the LC valve 62 in the fully open position from timepoint t2 to timepoint t4 before commanding the LC valve 62 to return to the flow restricted position at time t4, with a ramp-down in flow rate then occurring from timepoint T4 to timepoint T5 as the LC valve 62 returns to the flow restricted position. Comparatively, in embodiments in which the LC valve 62 assumes the form of variable flow control valve (e.g., an EM valve containing a proportional solenoid arrangement, such as that described above in connection with FIG. 2), the controller architecture 20 may command the LC valve 62 to vary its position in an increasingly gradual or more complex manner; e.g., such that the flowrate through the LC valve 62 is characterized by a piecewise function having any number of segments. This may be appreciated in FIG. 4 by referring to dashed line 146, which indicates one manner in which the controller architecture 20 may command the LC valve 62 (e.g., when containing a proportional solenoid) to more gradually transition toward the flow restricted position from timepoint T3 to timepoint T5. In either case, the controller architecture 20 effectively boosts cooling lubricant flow through the LC valve 62 and to the DL clutch pack 60 over the flow boost period (T1-T5) beginning in conjunction with clutch engagement.

In certain instances, the controller architecture 20 may carry-out the lubricant boost schedule represented by the flow boost characteristic 144 for any and all CL clutch packs 60 contained in the PST 12 and regardless of the particular operational conditions under which clutch engagement occurs. In other instances, multiple flow boost schedules or schemes may be stored within the memory 68, with different flow boost schedules assigned to or associated with different clutch packs and/or tied to variances in the conditions under which the clutch engagement occurs. For example, in embodiments, a first flow boost schedule may be carried-out for the clutch pack or clutch packs of a first type (e.g., clutch packs utilized to switch the rotational output direction of the PST 12); while a second flow boost schedule may be followed for a second clutch pack type (e.g., clutch packs responsible for varying the rotational speed output of the PST 12), with the second flow boost schedule having a shortened duration or a lower average flow rate than does the first flow boost schedule. Similarly, in embodiments, the controller architecture 20 may select amongst multiple flow boost schedules stored in the memory 68 based upon an anticipated energy input level or heating intensity level of the current CE event. For example, when a higher energy CE event is projected to occur, the controller architecture 20 may control the relevant LC valve(s) 62 in accordance with the flow boost characteristic 144 set-forth in FIG. 4. Conversely, when a lower energy CE event is projected to occur, the controller architecture 20 may control the relevant LC valve(s) 62 in accordance with a different flow boost schedule having a shortened duration and/or a reduced lubricant flow rate during the lubricant boost. Examples of such alternative flow boost schemes are graphically expressed in FIGS. 5 and 6.

Figure 5:
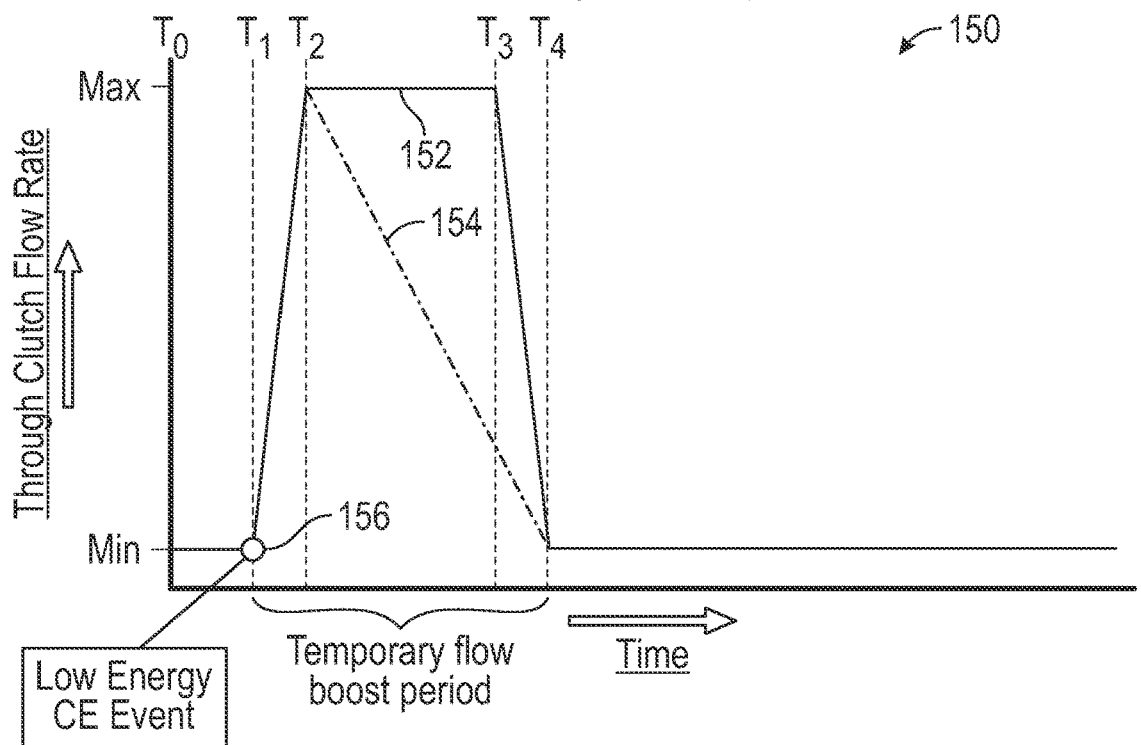
FIG. 5 graphically illustrates a second example manner in which the intelligent clutch lubrication system may vary lubricant flow through a DL clutch pack during a low energy CE event, while reducing the duration of lubricant flow boost relative to the high energy CE flow boost schedule of FIG. 4.

Referring first to FIG. 5, an example duration-varied lubricant boost schedule is presented via a graph 150, which is similar the graph 142 discussed above in connection with FIG. 4. In this example, a low energy CE event occurs at timepoint T1, as indicated by a marker 156. The controller architecture 20 projects such a CE event to have a relatively low heating intensity level based upon clutch type (e.g., whether the clutch pack at issue is utilized for directional or speed adjustments) and pertinent sensor data, such as the disparity in shaft speeds placed in rotational engagement via actuation of the DL clutch pack 60. As indicated by a flow boost function or characteristic 152, the controller architecture 20 commands the LC valve 62 to transition to a fully opened position at timepoint T1, with a ramp-up period occurring from timepoint T1 to T2 as the LC valve opens. In the case of a shutoff valve, the LC valve 62 may then remain in the fully open position from timepoint T2 to T3, and transition to the flow restricted position from timepoint T3 to T4 as shown. Comparatively, when the LC valve 62 assumes the form a proportional solenoid, the controller architecture 20 may command the LC valve 62 to return to the flow restricted position in a more gradual manner, as indicated by an alternative segment 154 of the flow boost characteristic 152. This effectively mimics the lubricant boost schedule represented by the flow boost characteristic 152, while reducing the duration of the lubricant boost period (T1 to T4) relative to that that shown in FIG. 4 to better match or correspond with the anticipated cooling needs of the newly-engaged clutch pack.

Figure 6:
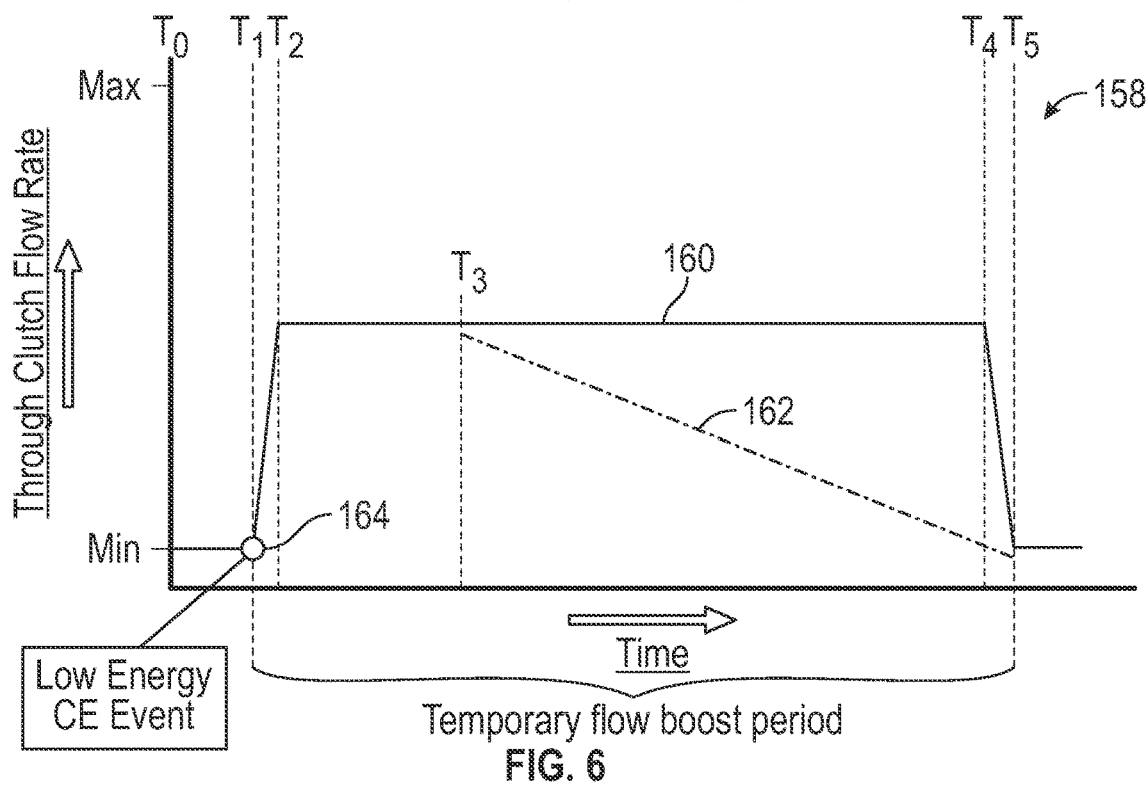
FIG. 6 graphically illustrates a further example manner in which the intelligent clutch lubrication system may vary lubricant flow to a DL clutch pack during a low energy CE event, while reducing the average lubricant flow rate relative to the high energy CE flow boost schedule of FIG. 4.

In addition to or in lieu of varying the duration of lubricant flow boost in the above-described manner, the controller architecture 20 may further vary the lubricant flow rate through a given DL clutch pack 60 in implementations in which the corresponding LC valve 62 is a flow control (EM) valve capable of maintaining a valve element in a range of stable positions. In this case, the controller architecture 20 may control the LC valve 62 to provide an increased flow rate of lubricant flow through a given DL clutch pack 60 when detecting a higher energy CE event; and provide a decreased lubricant flow rate through the DL clutch pack 60 when detecting a lower energy CE event. Again, such variations in flow rate can be implemented in a gradual or continual manner; or, instead, in a discrete or stepped manner. Referring briefly to FIG. 6, there is shown a graph 158 in which the controller architecture 20 varies the average flow rate of the lubricant flow through a DL clutch pack 60 during a low energy CE event (marker 164). As indicated by a flow boost function or characteristic 160, the duration of the flow boost period (T1 to T5) is substantially equivalent to that shown in the example of FIG. 4; however, the average flow rate through the LC valve 62 and, therefore, through the associated DL clutch pack 60 has been decreased to provide lubricant flow more commensurate with the anticipated cooling demands of the clutch pack 60. Accordingly, at the peak or plateau of the flow boost characteristic 160, the through-clutch flow rate is less than (e.g., approximately half) that shown in FIG. 4, as maintained from about timepoint T2 to T4 in an embodiment; or, instead, from about timepoint T2 to T3, with a more gradual tapering of the flow rate then occurring from T3 to T5, as indicated by segment 162.

Various combinations of the above-described teachings may also be provided such that the controller architecture 20 may adjust both the average flow rate and the duration of the flow boost period depending upon sensor data in alternative embodiments of the intelligent clutch lubrication system 10. Additionally, the controller architecture 20 of the intelligent clutch lubrication system 10 may also consider other pertinent data, such as data indicative of a current (pre-engagement) temperature of a given DL clutch pack or a current temperature of the cooling lubricant flow in modifying the duration of the flow boost period and/or the lubricant flow rate during the flow boost in embodiments. So too may information stored in the memory 68 describing a particular DL clutch pack, such as the purpose of the DL clutch pack 60 (whether the clutch pack is utilized for PST speed or directional changes), may also be considered by the controller architecture 20 in embodiments in determining an average flow rate and/or the duration of the flow boost period when temporarily boosting lubricant flow to a DL clutch pack 60 in conjunction with clutch pack engagement, as previously described. Considerable design flexibility is thus provided enabling the controller architecture 20 to execute any number and type of flow boost schedules or schemes to optimize the performance characteristics of the intelligent clutch lubrication system 10 to best suit a particular application or work vehicle.

Regardless of whether the intelligent clutch lubrication system 10 varies such characteristics of the lubricant flow boost depending upon prevailing operational conditions or other factors, or the intelligent clutch lubrication system 10 follows a universal flow boost schedule in each instance of clutch engagement for all DL clutch packs 60, embodiments of the intelligent clutch lubrication system 10 favorably improve heat dissipation from the clutch packs 60, while providing other appreciable benefits (e.g., minimizing energy losses and windage within the PST clutch packs, enabling a potential reduction in the lubricant volume utilized by the system 10, and/or enabling a potential downsizing of the lubricant supply pump 50). Further, embodiments of the intelligent clutch lubrication system 10 can be integrated into existing system designs with relatively minimal changes in hardware (e.g., the introduction of LC valves 62 and associated plumbing changes), with the above-described processes largely implemented through changes in computer-readable instructions or code stored in memory, to streamline cost effective adoption of the present teachings.

Enumerated Examples of the Intelligent Clutch Lubrication System

The following examples of intelligent clutch lubrication systems are further provided and numbered for ease of reference.

1. An intelligent clutch lubrication system is utilized in conjunction with a work vehicle powershift transmission (PST) containing first and second PST components. In an example embodiment, the intelligent clutch lubrication system includes a first dynamically-lubricated (DL) clutch pack movable between an engaged position and a disengaged position to rotationally couple and decouple the first and second PST components, respectively. In addition to the first DL clutch pack, the intelligent clutch lubrication system includes a supply pump, a first lubricant control (LC) valve, and a lubricant flow circuit having a clutch lubrication loop in which the first clutch pack is positioned. When active, the supply pump urges lubricant flow about the lubricant flow circuit and through the clutch lubrication loop. The first LC valve is positioned in the clutch lubrication loop at a location upstream of the first clutch pack, while a controller architecture is operably coupled to the first LC valve. The controller architecture is configured to control the first LC valve to temporarily boost lubricant flow to the first DL clutch pack when initially moved into the engaged position during operation of the intelligent clutch lubrication system.

2. The intelligent clutch lubrication system of example 1, wherein the controller architecture is configured to: (i) when the first DL clutch pack moves into the engaged position during operation of the intelligent clutch lubrication system, control the first LC valve to boost lubricant flow to the first DL clutch pack for a flow boost period commencing substantially concurrently with engagement of the first DL clutch pack; and (ii) further control the first LC valve to reduce or block lubricant flow to the first DL clutch pack when the flow boost period elapses.

3. The intelligent clutch lubrication system of example 2, further including a memory coupled to the controller architecture. The controller architecture is configured to determine a duration of the flow boost period utilizing data stored in the memory and associated with the first DL clutch pack.

4. The intelligent clutch lubrication system of example 2, further including a work vehicle sensor coupled to the controller architecture and configured to supply sensor data thereto. The controller architecture is configured to determine a current duration of the flow boost period utilizing the sensor data in conjunction with movement of the first DL clutch pack into the engaged position.

5. The intelligent clutch lubrication system of example 4, wherein the work vehicle sensor includes a speed sensor configured to generate rotational speed data indicative of a rotational speed of component contained in, or mechanically linked to, the work vehicle PST. The controller architecture is configured to determine the current duration of the flow boost period utilizing the rotational speed data in conjunction with movement of the first DL clutch pack into the engaged position.

6. The intelligent clutch lubrication system of example 4, wherein the work vehicle sensor includes a lubricant temperature sensor configured to generate lubricant temperature data indicative of a current temperature of lubricant circulated through the lubricant flow circuit. The controller architecture is configured to determine the current duration of the flow boost period utilizing the lubricant temperature data in conjunction with movement of the first DL clutch pack into the engaged position.

7. The intelligent clutch lubrication system of example 4, wherein the intelligent clutch lubrication system is deployed onboard a work vehicle equipped with a bucket or bed for carrying a material load. The controller architecture is configured to determine the current duration of the flow boost period based, at least in part, on estimation material load currently carried by the work vehicle in conjunction with movement of the first DL clutch pack into the engaged position.

8. The intelligent clutch lubrication system of example 4, wherein the intelligent clutch lubrication system is deployed onboard a work vehicle. The controller architecture is configured to determine the current duration of the flow boost period based, at least in part, on whether the work vehicle is switching between forward and rearward directions by virtue of movement of the first DL clutch pack into the engaged position.

9. The intelligent clutch lubrication system of example 4, wherein the first LC valve includes a proportional solenoid. The controller architecture is configured to command the first LC valve to gradually vary a flow rate of lubricant supplied to the first DL clutch pack over at least a portion of the flow boost period.

10. The intelligent clutch lubrication system of example 4, wherein the first LC valve includes a bistable shutoff valve movable between a fully opened position and a flow restricted position. The controller architecture is configured to: (i) command the bistable shutoff valve to move from the flow restricted position into the fully opened position in conjunction with movement of the first DL clutch pack into the engaged position; and (ii) command the first LC valve to move from the fully opened position into the flow restricted position when the flow boost period elapses.

11. The intelligent clutch lubrication system of example 4, wherein the controller architecture is configured to: (i) utilize the sensor data to project a heating intensity level associated with engagement of the first DL clutch pack; and (ii) command the first LC valve to vary an average flow rate of lubricant supplied to the first DL clutch pack during the flow boost period based, at least in part, on the projected heating intensity level.

12. The intelligent clutch lubrication of system example 4, wherein the controller architecture is configured to: (i) utilize the sensor data to project a heating intensity level associated with engagement of the first DL clutch pack; and (ii) command the first LC valve to vary the current duration of the flow boost period based, at least in part, on the projected heating intensity level.

13. The intelligent clutch lubrication system of example 1, further including a second DL clutch pack positioned in the lubricant flow circuit and a second LC valve. The second LC valve is operably coupled to the controller architecture and positioned in the lubricant flow circuit at a location upstream of the second DL clutch pack.

14. The intelligent clutch lubrication system of example 13, wherein the controller architecture is configured to independently command the first LC valve and the second LC valve to vary lubricant flow supplied to the first DL clutch pack and to the second DL clutch pack, respectively, during operation of the intelligent clutch lubrication system.

15. The intelligent clutch lubrication system of example 13, wherein the work vehicle PST includes a PST output shaft. The first DL clutch pack and the second first DL clutch pack are controllable to vary a rotational speed and a rotational direction of the PST output shaft, respectively.

CONCLUSION

There has thus been provided systems and methods for providing intelligent lubrication of one or more DL clutch packs within a PST onboard a work vehicle. The intelligent clutch lubrication system may include a processing subsystem or controller architecture (e.g., assuming the form of or including a TCU), which controls any suitable number of LC valves to temporarily boost lubricant flow through one or more DL clutch packs in conjunction with clutch pack engagement. In certain implementations, the controller architecture may also adjust one or more aspects of the lubricant flow boost, such as the boost flow period and/or the average flow rate during the boost flow period, based on pertinent sensor data, data stored in memory, or a combination thereof. In other instances, this may not be the case. In either instance, the intelligent clutch lubrication system selectively boosts cooling lubricant flow through a given DL clutch pack on an individualized, as-needed basis to provide enhanced heat dissipation commensurate with cooling and usage demands of at least one clutch pack within a work vehicle PST. The overall heat dissipation capabilities of the intelligent clutch lubrication system may be enhanced as a result, potentially while minimizing windage losses within the clutch package, enabling supply pump downsizing, and/or enabling a reduction in the cumulative volume of lubricant required by the clutch lubrication system.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As used herein, the singular forms "a", "an," and "the" are intentionally-grown to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An intelligent clutch lubrication system utilized in conjunction with a work vehicle powershift transmission (PST) containing first and second PST components, the intelligent clutch lubrication system comprising:
a first dynamically-lubricated clutch pack movable between an engaged position and a disengaged position to rotationally couple and decouple the first and second PST components, respectively;
a lubricant flow circuit including a clutch lubrication loop in which the first dynamically-lubricated clutch pack is positioned;

a supply pump fluidly coupled to the lubricant flow circuit and, when active, urging lubricant flow about the lubricant flow circuit and through the clutch lubrication loop;

a first lubricant control (LC) valve positioned in the clutch lubrication loop at a location upstream of the first dynamically-lubricated clutch pack;

a controller architecture operably coupled to the first LC valve and configured to control the first LC valve to temporarily boost lubricant flow to the first dynamically-lubricated clutch pack when initially moved into the engaged position during operation of the intelligent clutch lubrication system; and a work vehicle sensor coupled to the controller architecture and configured to supply sensor data thereto;

wherein the controller architecture is configured to determine a current duration of a flow boost period utilizing the sensor data in conjunction with movement of the first dynamically-lubricated clutch pack into the engaged position.

2. The intelligent clutch lubrication system of claim 1, wherein the controller architecture is configured to:

when the first dynamically-lubricated clutch pack moves into the engaged position during operation of the intelligent clutch lubrication system, control the first LC valve to boost lubricant flow to the first dynamically-lubricated clutch pack for the flow boost period commencing substantially concurrently with engagement of the first dynamically-lubricated clutch pack; and further control the first LC valve to reduce or block lubricant flow to the first dynamically-lubricated clutch pack when the flow boost period elapses.

3. The intelligent clutch lubrication system of claim 2, further comprising a memory coupled to the controller architecture;

wherein the controller architecture is configured to determine a duration of the flow boost period utilizing data stored in the memory and associated with the first dynamically-lubricated clutch pack.

4. The intelligent clutch lubrication system of claim 1, wherein the work vehicle sensor comprises a speed sensor configured to generate rotational speed data indicative of a rotational speed of component contained in, or mechanically linked to, the work vehicle PST; and wherein the controller architecture is configured to determine the current duration of the flow boost period utilizing the rotational speed data in conjunction with movement of the first dynamically-lubricated clutch pack into the engaged position.

5. The intelligent clutch lubrication system of claim 1, wherein the work vehicle sensor comprises a lubricant temperature sensor configured to generate lubricant temperature data indicative of a current temperature of lubricant circulated through the lubricant flow circuit; and wherein the controller architecture is configured to determine the current duration of the flow boost period utilizing the lubricant temperature data in conjunction with movement of the first dynamically-lubricated clutch pack into the engaged position.

6. The intelligent clutch lubrication system of claim 1, wherein the intelligent clutch lubrication system is deployed onboard a work vehicle equipped with a bucket or bed for carrying a material load;

wherein the controller architecture is configured to determine the current duration of the flow boost period based, at least in part, on estimation material load currently carried by the work vehicle in conjunction with movement of the first dynamically-lubricated clutch pack into the engaged position.

7. The intelligent clutch lubrication system of claim 1, wherein the intelligent clutch lubrication system is deployed onboard a work vehicle; and wherein the controller architecture is configured to determine the current duration of the flow boost period based, at least in part, on whether the work vehicle is switching between forward and rearward directions by virtue of movement of the first dynamically-lubricated clutch pack into the engaged position.

8. The intelligent clutch lubrication system of claim 1, wherein the first LC valve comprises a proportional solenoid; and wherein the controller architecture is configured to command the first LC valve to gradually vary a flow rate of lubricant supplied to the first dynamically-lubricated clutch pack over at least a portion of the flow boost period.

9. The intelligent clutch lubrication system of claim 1, wherein the first LC valve comprises a bistable shutoff valve movable between a fully opened position and a flow restricted position; and wherein the controller architecture is configured to:

command the bistable shutoff valve to move from the flow restricted position into the fully opened position in conjunction with movement of the first dynamically-lubricated clutch pack into the engaged position; and command the first LC valve to move from the fully opened position into the flow restricted position when the flow boost period elapses.

10. The intelligent clutch lubrication system of claim 1, wherein the controller architecture is configured to:

utilize the sensor data to project a heating intensity level associated with engagement of the first dynamically-lubricated clutch pack; and command the first LC valve to vary an average flow rate of lubricant supplied to the first dynamically-lubricated clutch pack during the flow boost period based, at least in part, on the projected heating intensity level.

11. The intelligent clutch lubrication system of claim 1, wherein the controller architecture is configured to:

utilize the sensor data to project a heating intensity level associated with engagement of the first dynamically-lubricated clutch pack; and command the first LC valve to vary the current duration of the flow boost period based, at least in part, on the projected heating intensity level.

12. An intelligent clutch lubrication system utilized in conjunction with a work vehicle powershift transmission (PST) containing first and second PST components, the intelligent clutch lubrication system comprising:

a first dynamically-lubricated clutch pack movable between an engaged position and a disengaged position to rotationally couple and decouple the first and second PST components, respectively;

a lubricant flow circuit including a clutch lubrication loop in which the first dynamically-lubricated clutch pack is positioned;

a supply pump fluidly coupled to the lubricant flow circuit and, when active, urging lubricant flow about the lubricant flow circuit and through the clutch lubrication loop;

a first lubricant control (LC) valve positioned in the clutch lubrication loop at a location upstream of the first dynamically-lubricated clutch pack;

a controller architecture operably coupled to the first LC valve and configured to control the first LC valve to temporarily boost lubricant flow to the first dynamically-lubricated clutch pack when initially moved into the engaged position during operation of the intelligent clutch lubrication system;

a second dynamically-lubricated clutch pack positioned in the lubricant flow circuit; and a second LC valve operably coupled to the controller architecture and positioned in the lubricant flow circuit at a location upstream of the second dynamically-lubricated clutch pack.

13. The intelligent clutch lubrication system of claim 12, wherein the controller architecture is configured to independently command the first LC valve and the second LC valve to vary lubricant flow supplied to the first dynamically-lubricated clutch pack and to the second dynamically-lubricated clutch pack, respectively, during operation of the intelligent clutch lubrication system.

14. The intelligent clutch lubrication system of claim 12, wherein the work vehicle PST includes a PST output shaft; wherein the first dynamically-lubricated clutch pack and the second dynamically-lubricated clutch pack are controllable to vary a rotational speed and a rotational direction of the PST output shaft, respectively.

15. The intelligent clutch lubrication system of claim 14, wherein the controller architecture is configured to:
control the first LC valve to supply the first dynamically-lubricated clutch pack, when initially engaged, with boosted lubricant flow for a first flow boost period; and
control the second LC valve to supply the second dynamically-lubricated clutch pack, when initially engaged, with boosted lubricant flow for a second flow boost period exceeding the first flow boost period.

16. The intelligent clutch lubrication system of claim 14, wherein the controller architecture is configured to:
control the first LC valve to supply the first dynamically-lubricated clutch, when initially engaged, with boosted lubricant flow at a first average flow rate over a first flow boost period; and
control the second LC valve to supply the second dynamically-lubricated clutch pack, when initially engaged, with boosted lubricant flow at a second average flow rate over a second flow boost period, the second average flow rate exceeding the first average flow rate.

17. A method carried-out by a controller architecture included in an intelligent clutch lubrication system onboard a work vehicle having a powershift transmission (PST), the controller architecture operably coupled to a first lubricant control (LC) valve positioned in a clutch lubrication loop at a location upstream of a first dynamically-lubricated clutch pack and operably coupled to a second LC valve positioned upstream of a second dynamically-lubricated clutch pack, the method comprising:
determining, utilizing data provided to the controller architecture, when the first dynamically-lubricated clutch pack moves from a disengaged position into an engaged position in which the first dynamically-lubricated clutch pack rotationally couples first and second components contained in the PST;
controlling the first LC valve, via commands transmitted from the controller architecture to the first LC valve, to temporarily boost lubricant flow to the first dynamically-lubricated clutch pack when initially moved into the engaged position during operation of the intelligent clutch lubrication system; and
independently varying lubricant flow supplied to the first dynamically-lubricated clutch pack and to the second dynamically-lubricated clutch pack via commands transmitted from the controller architecture to the first LC valve and to the second LC valve, respectively, during operation of the intelligent clutch lubrication system.

18. The method of claim 17, further comprising controlling the first LC valve, via commands transmitted from the controller architecture to the first LC valve, to:
boost lubricant flow to the first dynamically-lubricated clutch pack for a flow boost period commencing substantially concurrently with engagement of the first dynamically-lubricated clutch pack; and
reduce or block lubricant flow to the first dynamically-lubricated clutch pack when the flow boost period elapses.

* * * * *

UNITED STATES PATENT AND TRADEMARK OFFICE
CERTIFICATE OF CORRECTION

| | |
|---|---|
| PATENT NO. | : 11,773,926 B2 |
| APPLICATION NO. | : 17/504688 |
| DATED | : October 3, 2023 |
| INVENTOR(S) | : Danny G. Voth |

It is certified that error appears in the above-identified patent and that said Letters Patent is hereby corrected as shown below:

In the Claims

In Column 22, Lines 10-11, Claim 7, delete "dynamically-lubricated lubricated" and insert -- dynamically-lubricated --, therefor.

Signed and Sealed this
Fifth Day of December, 2023

Katherine Kelly Vidal
*Director of the United States Patent and Trademark Office*